(12) United States Patent
Jaiswal et al.

(10) Patent No.: US 11,410,043 B2
(45) Date of Patent: Aug. 9, 2022

(54) HAMMING DISTANCE BASED ROBUST OUTPUT ENCODING FOR IMPROVED GENERALIZATION

(71) Applicant: INTERNATIONAL BUSINESS MACHINES CORPORATION, Armonk, NY (US)

(72) Inventors: Mayoore Selvarasa Jaiswal, Austin, TX (US); Minsik Cho, Austin, TX (US); Bumsoo Kang, Daejeon (KR)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 16/413,988

(22) Filed: May 16, 2019

(65) Prior Publication Data
US 2020/0364578 A1 Nov. 19, 2020

(51) Int. Cl.
*G06F 17/16* (2006.01)
*G06K 9/62* (2022.01)
*G06N 3/08* (2006.01)
*G06N 3/04* (2006.01)

(52) U.S. Cl.
CPC .......... *G06N 3/084* (2013.01); *G06F 17/16* (2013.01); *G06K 9/6215* (2013.01); *G06N 3/0481* (2013.01)

(58) Field of Classification Search
None
See application file for complete search history.

(56) References Cited

U.S. PATENT DOCUMENTS

| 7,970,718 | B2 | 6/2011 | Guyon et al. |
| 8,095,483 | B2 | 1/2012 | Weston et al. |
| 8,810,439 | B1 | 8/2014 | Kalevo |
| 2017/0351530 | A1* | 12/2017 | Gupta ............... G06F 9/30087 |

OTHER PUBLICATIONS

Novak, R. et al, "Sensitivity and Generalization in Nueral Networks: An Empirical Study", ICLR, 2018.
Rodriguez, P et al. "Beyond One-Hot Encoding:Lower Dimensional Target Embedding" Image Vision Comput. Jun. 29, 2018.
Zhang, Y et al. "Multi-Label Output Codes Using Canonical Correlation Analysis" Proceedings of the Fourteenth International Conference on Artificial Intelligence and Statistics, PMLR 15:873-882, 2011.
Anonymous, "A System and Method for Minimum Hamming Distance Discovery Using Neuromorphic Hardware" IPCOM000248510D, Dec. 12, 2016.

(Continued)

*Primary Examiner* — Idowu O Osifade
(74) *Attorney, Agent, or Firm* — Stephen R. Yoder

(57) ABSTRACT

A computer-implemented method generates a hamming code based target label for each class of a dataset in which hamming distance between the target labels in the dataset is maximized and trains a convolutional neural network with the hamming codes based target label to thereby produce a trained AI model. The confusability between classes of the dataset is determined using a confusion matrix. The hamming distances of classes of the dataset that are determined to be more confusable are set to higher values than the hamming distances of classes of the dataset that are determined to be less confusable.

20 Claims, 7 Drawing Sheets

(56) References Cited

OTHER PUBLICATIONS

Anonymous, "A Computational Algorithms to Calculate or Approximate the Average Hamming Distance Between a Uniformly Distributed Variable and Teh Results of Various Arithmetic/Logic Operations on the Variable" IPCOM000146823D, Feb. 24, 2007.
Calmon et al., "Optimized Data Pre-Processing for Discrimination Prevention", arXiv:1704.03354v1 [stat.ML] Apr. 11, 2017, 18 pages.
Gebru et al., "Datasheets for Datasets", arXiv:1803.09010v8 [cs.DB] Dec. 1, 2021, 18 pages.
Gong et al., "Geodesic Flow Kernel for Unsupervised Domain Adaptation", Proceedings of the IEEE Conference on Computer Vision and Pattern Recognition (CVPR), 2012, 8 pages.
Li et al., "The Secrets of Salient Object Segmentation", CBMM Memo No. 014, Jun. 13, 2014, arXiv:1406.2807v2 [cs.CV] Jun. 12, 2014, 15 pages.
Tommasi et al., "A Deeper Look at Dataset Bias", 2012 edition of the Imagenet Large Scale Visual Recognition Challenge (ILSVRC, [34]), 19 pages.
Torralba et al., "Unbiased Look at Dataset Bias", Downloaded on Jun. 8, 2022 at 12:03:10 UTC from IEEE Xplore, 3 pages.
Zou et al., "AI can be sexist and racist—it's time to make it fair", Jul. 18, 2018, 7 pages.

\* cited by examiner

US 11,410,043 B2

HAMMING DISTANCE BASED ROBUST OUTPUT ENCODING FOR IMPROVED GENERALIZATION

BACKGROUND

The present invention relates to improving output encoding in neural networks.

SUMMARY

According to an embodiment of the present invention, the present invention provides a computer-implemented method comprising: generating a hamming code based target label for each class of a dataset in which hamming distance between the target labels in the dataset is maximized; and training a convolutional neural network with the modified dataset to thereby produce a trained AI model, wherein the confusability between classes of the dataset is determined using a confusion matrix, and wherein hamming distances of classes of the dataset that are determined to be more confusable are set to higher values than the hamming distances of classes of the dataset that are determined to be less confusable.

Other embodiments of the present invention include a system for implementing the above-described computer-implemented method and a computer program product comprising one or more computer readable storage devices and program instructions stored on the one or more computer readable storage devices, the stored program instructions comprising: program instructions for implementing the above-described computer-implemented method.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
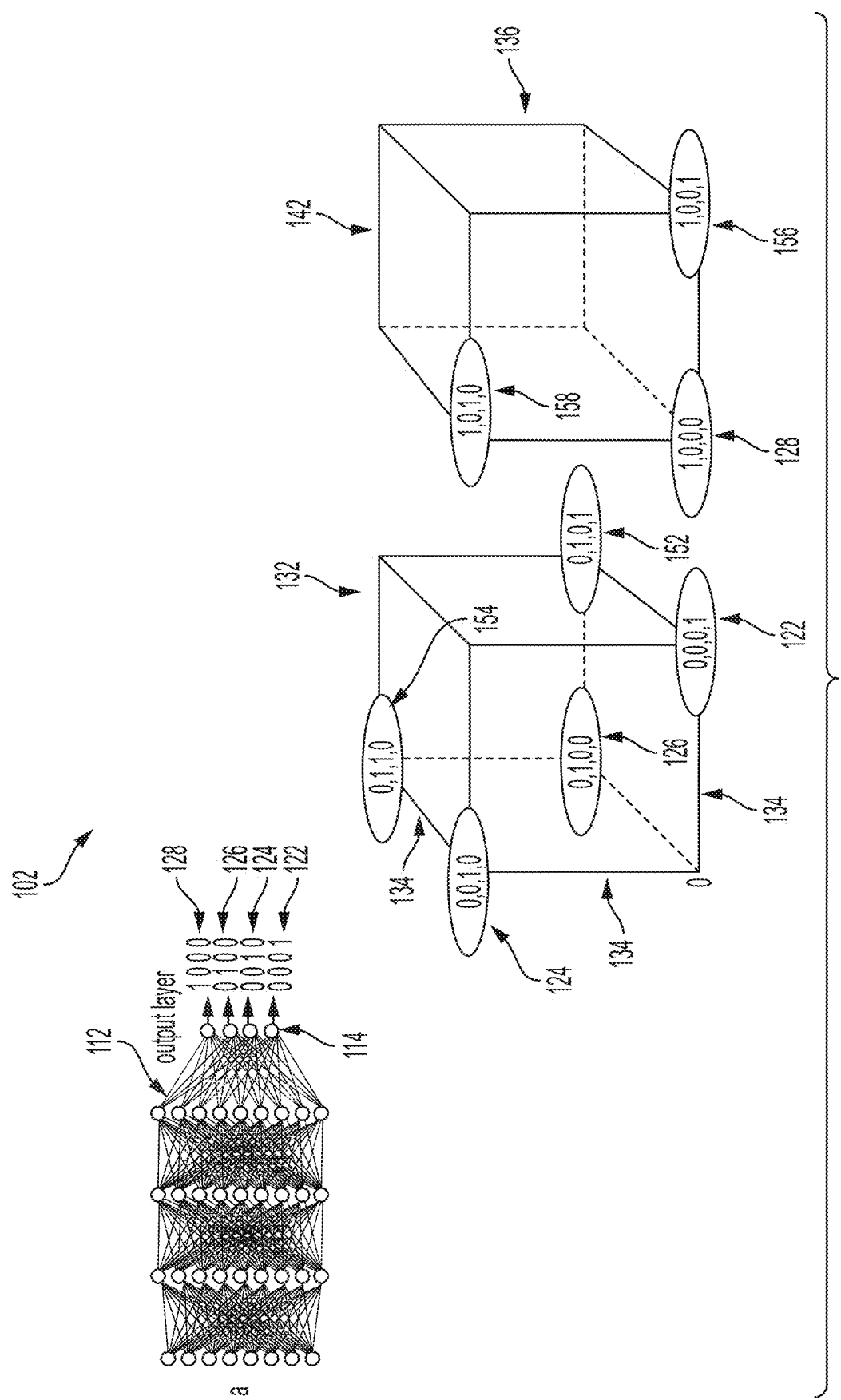
FIG. 1 is a diagram depicting a conventional classification scheme for a deep neural network and how hamming distance between output labels could be increased using multi-hot encoding.

FIG. 1 is a diagram depicting a conventional classification scheme 102 for a deep neural network 112. Deep neural network 112 at output layer 114 produces one-hot encoding for output labels 122, 124, 126 and 128. That is, each of output labels have the same number of 1's and 0's. The hamming distance between output labels 122, 124 and 126 is fixed at 2 as shown in hamming distance diagram 132 for output labels where the first digit is 0. Hamming distance can be determined by counting edges 134 of cube 136 between two output labels on hamming distance diagram 132. Hamming distance diagram 142 shows the single output label, i.e., output label 128, where the first digit of the output label is 1.

If multi-hot output labels 152, 154, 156 and 158 are added as output labels, the hamming distance is no longer fixed at 2 between the output labels in hamming distance diagram 132. The traditional approach is to use one-hot encoding such as labels 122, 124, 126 and 128. The hamming distance between those codes are fixed at 2. We propose to use a multi-bit approach, i.e. 2 or more bits are active per code. As shown in codes 152, 154, 156 and 158 there are 2 bits active (set to '1') in each code. The hamming distance between these codes are 2 or more. All codes in the chosen set will contain the same number of active bits. That is, in all codes in the set {152, 154, 156, 158} have 2 active bits. This set shall not be mixed with the one-hot set {122, 124, 126, 128}.

Figure 2:
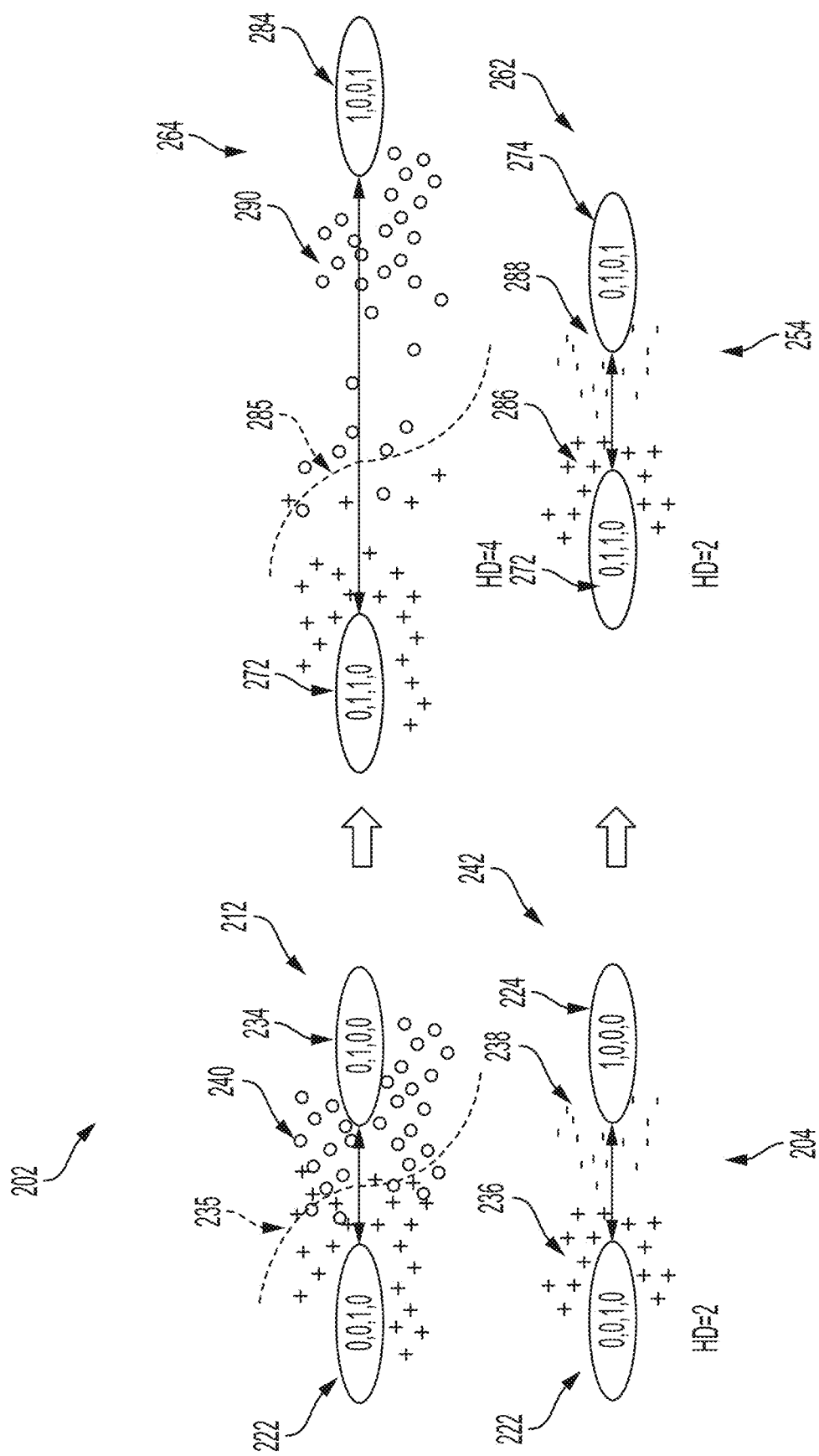
FIG. 2 is a diagram depicting a scheme for better encoding in a neural network by increasing the hamming distance in the output labels of the neural network.

FIG. 2 is a diagram 202 depicting a scheme for better encoding in a neural network, such as the neural network shown in FIG. 1, by increasing the hamming distance in the output labels of the neural network. Left side 204 of diagram 202 depicts output labels for a classification scheme, such as classification scheme 102 of FIG. 1, where the output labels are one-hot and the hamming distance is 2. Plus signs 236 represent data for the class represented by output label 222, minus signs 238 represent data for the class represented by output label 224 and o's 240 represent data for the class represented by output label 234. Diagram 242 shows that if the data is separable, then there is low chance of mis-prediction even if one uses one-hot codes with a fixed hamming distance of 2. However, as shown in FIG. 212, if the data is not separable, then the chance of mis-prediction is high when using one-hot codes.

Right side 254 of diagram 202 depicts output labels for a classification scheme, where the output labels are multi-hot. In diagram 262 the hamming distance is 2. In diagram 264, the hamming distance is 4. Plus signs represent data for the class represented by output label 272, minus sings represent data for the class represented by output label 274 and o's represent data for the class represented by output label 284. Plus signs 286 represent data for the class represented by output label 272, minus signs 288 represent data for the class represented by output label 274 and o's 290 represent data for the class represented by output label 284. If the data is separable, using codes with higher hamming distance wouldn't have added benefit from using codes with hamming distance equal to 2. But, when the data isn't separable when using codes with hamming distance equal 2, using codes with higher hamming distance will help to separate the data.

Figure 3:
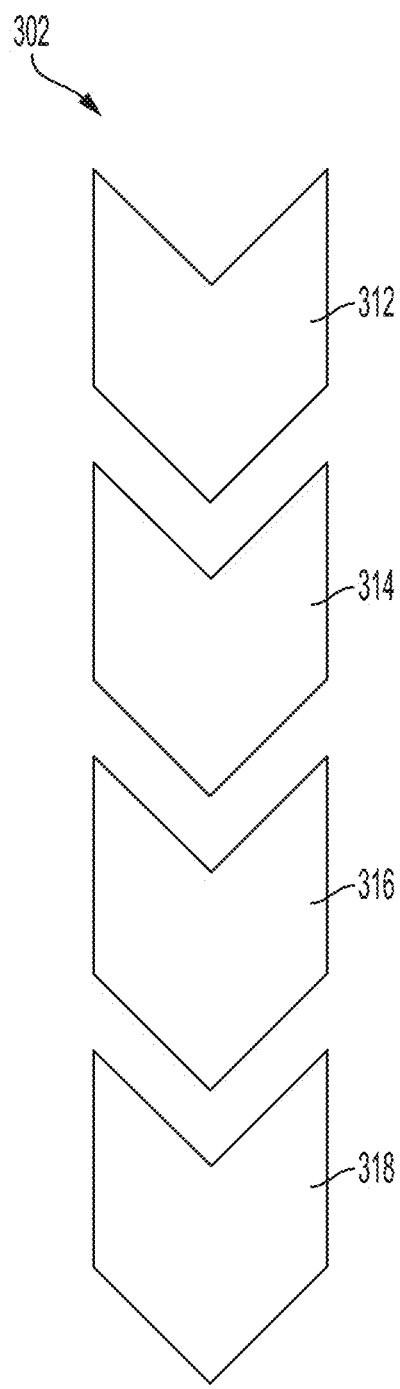
FIG. 3 is a flowchart depicting a method of training an artificial intelligence (AI) model according to an embodiment of the present invention.
Figure 4:
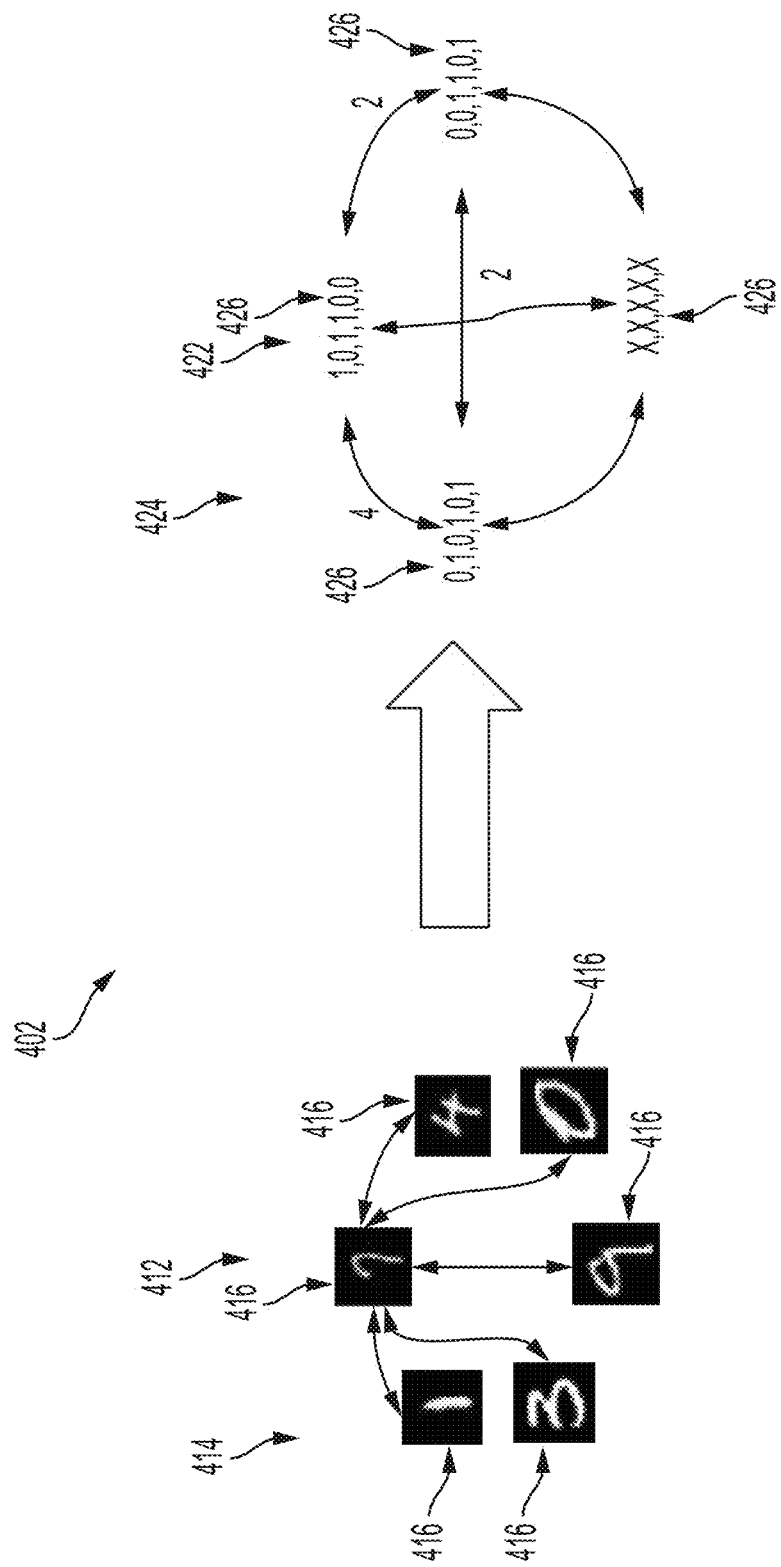
FIG. 4 is diagram depicting a method of generating hamming codes according to an embodiment of the present invention.
Figure 5:
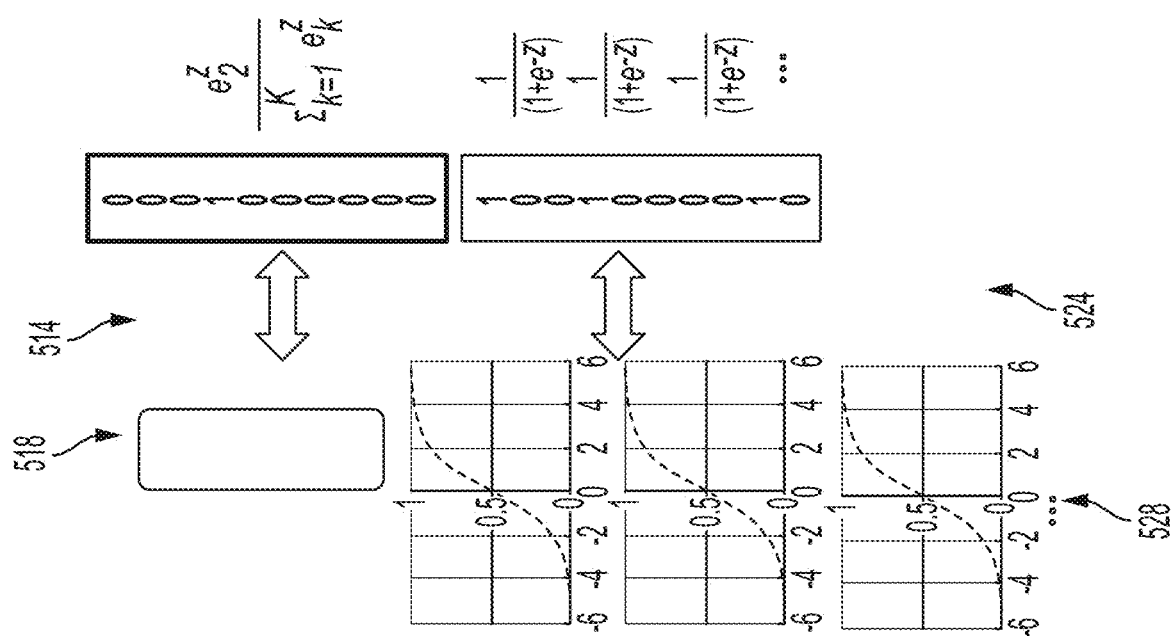
FIG. 5 is a diagram depicting a training architecture for an AI model according to an embodiment of the present invention and illustrates the difference between the traditional one-hot method and an embodiment of the present invention.
Figure 5:
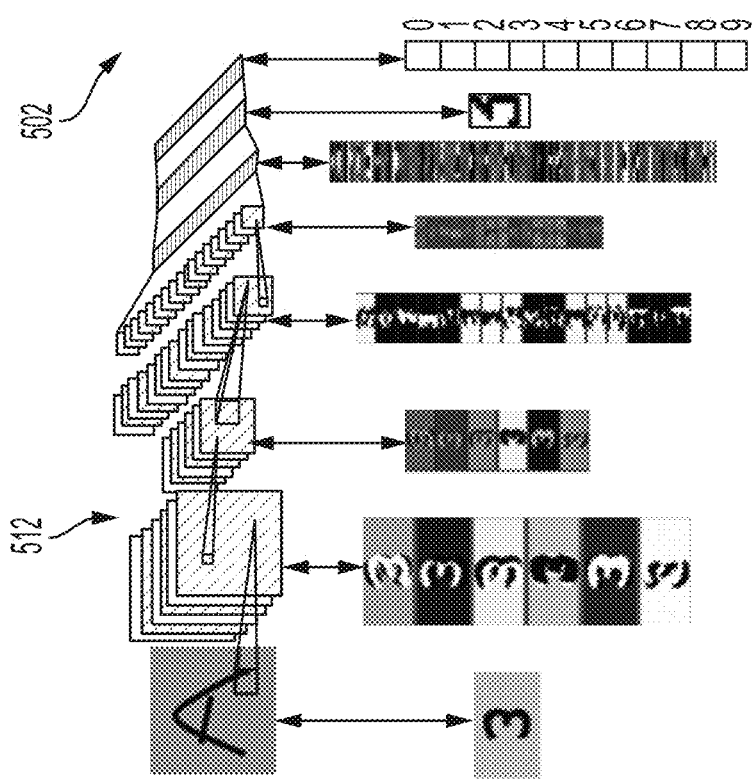

FIG. 3 is a flowchart 302 depicting a method of training an artificial intelligence (AI) model according to an embodiment of the present invention. At step 312, the inter-class similarity in a dataset is examined. An N×N matrix that indicates the degree of "confusability" between classes, e.g. the numbers 1 and 7 look alike, particularly when handwritten. At step 314, the hamming distance between easily confused classes is maximized. At step 316, a convolutional neural network is chosen for the AI model and ground-truth labels are used as hamming codes. At step 318, backpropagation with binary cross entropy loss is performed. FIGS. 4 and 5 illustrate these steps in detail.

A confusion matrix (CM) between classes of a dataset used in various embodiments of the present invention may be generated in a variety of ways. For example, a pretrained neural network could be run on a dataset to produce a CM, measuring data similarity between classes of a dataset could be used to compute a CM, etc. Consider the following case for further illustration of computing the CM. A model trained on MNIST data with one-hot encoding is taken. Inferencing is done on all images in the MNIST test dataset to produce the CM. Each entry $C_{ij}$ in the CM indicates total number of images that had a ground-truth class i, but predicted to belong to class j. If two classes i and j are easily confused, $C_{ij}$ would be a large number than in cases where two classes are distinct. This matrix is thresholded and post-processed to get a set of weights for easily confusable classes.

In an embodiment of the present invention, the confusability between classes of a dataset may be determined by reconstructing data for each class using an autoencoder trained using a first class of the classes and determining a reconstruction error for each class other than the first class. An example of how the confusability between two classes, a reference class and a target class, of a dataset may be determined using an autoencoder trained for a first class, i.e. the "reference class", and using the trained autoencoder to determine a reconstruction error for a second class of the dataset, i.e., the "target class", is described below.

In this example of determining the reconstruction error of a target class of a dataset, the dataset consists of images of handwritten numbers. An autoencoder is trained with a reference class of images of handwritten number 3's. The "target class" is images of handwritten number 5's. A reference input image sample of a handwritten number 3 from the reference class and a target input image sample of a handwritten number are each input to an input layer 624 of an autoencoder trained on the reference class of images, i.e., handwritten number 3's. The trained autoencoder then encodes a latent space representation of the reference input image sample and encodes a latent space representation of the target input image sample. The latent space representation of the reference input image sample is reconstructed by the trained autoencoder to output a reconstructed reference image output for the reference input image sample. Also, the latent space representation of target input image sample is reconstructed by the trained autoencoder to output a reconstructed target image output for target input image sample. The similarity of reconstructed target image output to the target input image sample can then be compared in a quantitative fashion using any of several techniques, such as by a pixel-by-pixel comparison to measure quantitatively the similarity between the reconstructed target image output to the target input image sample. Other techniques for measuring quantitatively the similarity between the reconstructed target image output to the target input image sample may include techniques such as but not limited to: binary cross entropy, color histograms, cosine similarity, SIFT features, SURF features, or ORB features, etc. By repeating the above-described process with other sets of image samples that include a reference image sample from the reference class and a target image sample from the target, it is possible to quantitatively measure the confusability between the target class and the reference class. Furthermore, by using other classes, besides the class of images of handwritten number 5's as the target class, it is possible to determine the confusability between all of the classes of the dataset and the reference class, i.e. images of handwritten 5's. In addition, by using an autoencoder trained with any class of the dataset and using that class as the "reference class" and any other class as the "target class" it is possible in a similar manner to determine the confusability between any other class of the dataset and a particular reference class.

FIG. 4 is a diagram 402 depicting a method of generating hamming codes according to an embodiment of the present invention. On left side 412 of diagram 402 is depicted a complete graph 414 with six nodes 416 with confusion metrics on edges. For the given number of hots (M) in a given length of encoding (L), there are a high number of possible encodings (MCL) and the hamming distance between a pair of encodings can be easily obtained, which can be formed as a complete graph 422 on right side 424 of diagram 402. In complete graph 422, nodes 426 represent possible encodings and the edges are weighted with the hamming distance between two connected encoding nodes. Let C denote the number of semantic classes in the dataset. The goal is to assign C classes to a subset of the graph (i.e., map each class to a node in the graph) in a way that two classes with higher confusion level are mapped to two encoding nodes connected via an edge with a greater hamming distance. The optimization process is done by maximizing the following objective function where N is the total number of classes. $W_{ij}$ and $H_{ij}$ are the inter-class similarity and the hamming distance between class i and class j.

$$\max \frac{N(N-1)}{2} \times H_{min} + \sum_{i=0}^{N-1} \sum_{j=i+1}^{N} W_{ij} H_{ij}$$

FIG. 5 is a diagram depicting a training architecture 502 for an AI model according to an embodiment of the present invention. A convolutional neural network (CNN) architecture 512 is chosen. As shown in FIG. 5, a traditional method 514 is to use one-hot encoding labels, as indicated by arrow 516, with a softmax layer 518. FIG. 5 also shows a method 524 of an embodiment of the present invention, where multi-hot hamming codes are used, as indicated by arrow 526, with sigmoid layer 528. After choosing the setup, images in the training set are forward and backward propagated through CNN 512 to obtain the trained AI model. Note that the total number of neurons in the model and the number of computations are the same in traditional method 514 and in method 524 of an embodiment of the present invention. However, method 524 yields more generalizable models.

Figure 6:
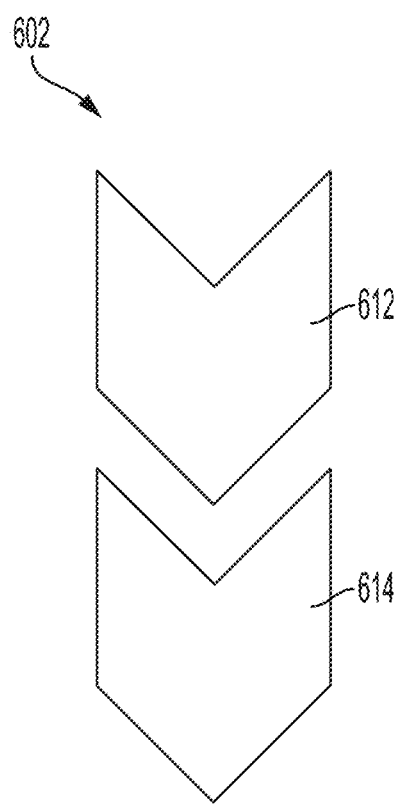
FIG. 6 is a flowchart depicting a method of producing an inference result using an artificial intelligence (AI) model according to an embodiment of the present invention.

FIG. 6 depicts a flowchart 602 depicting a method of producing an inference result using an artificial intelligence (AI) model according to an embodiment of the present invention. At step 612, an input image is forward propagated through a trained AI model, such as an AI model trained using the method shown in FIG. 3. At step 614, the top-k logits are binarized to produce a binarized code, the Euclidean distance from the binarized code is computed to the set of target hamming codes and selecting an output label corresponding to the closest hamming code.

Figure 7:
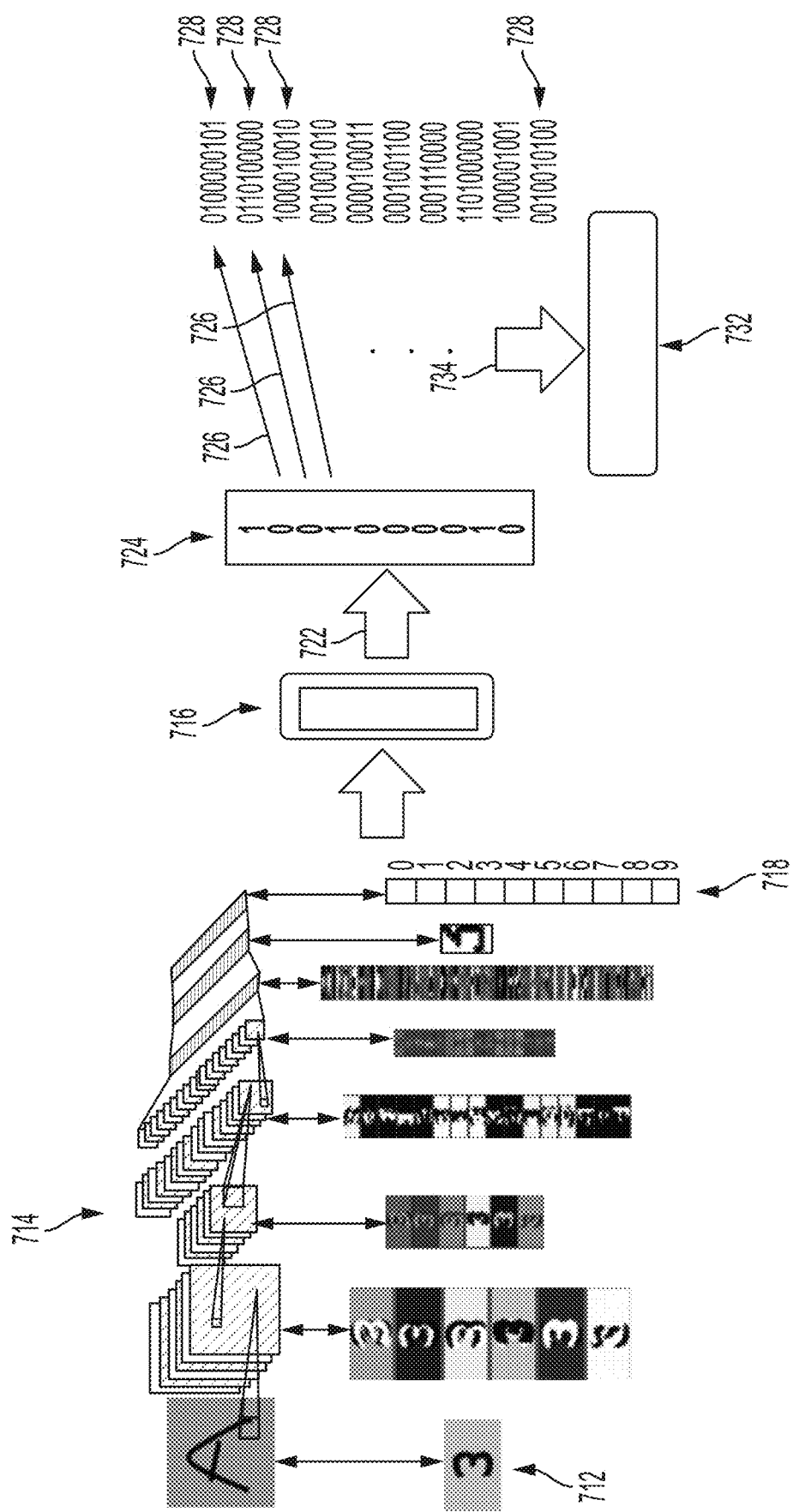
FIG. 7 is a diagram depicting an inference architecture according to an embodiment of the present invention.

FIG. 7 is a diagram 702 depicting an inference architecture according to an embodiment of the present invention. This is an example of the flowchart presented in FIG. 6. In this example, an input image 712 of the number '3' is forward propagated through an AI model 714 trained according to an embodiment of the present invention. Top-k logits 716 of output 718 of AI model 714 are binarized as indicated by arrow 722 to produce binarized code 724. Then a Euclidean distance, indicated by arrows 726, to each of target hamming codes 728 and binarized code 724 is computed. A target label 732 corresponding to the closest hamming code is chosen, as indicated by arrow 734, as the label for each input image 712.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    generating a hamming code based target label for each class of a dataset in which hamming distance between the target labels in the dataset is maximized; and
    training a convolutional neural network with the modified dataset to thereby produce a trained AI model,
    wherein confusability between classes of the dataset is determined using a confusion matrix, and
    wherein hamming distances of classes of the dataset that are determined to be more confusable are set to higher values than the hamming distances of classes of the dataset that are determined to be less confusable.

2. The computer-implemented method of claim 1, wherein the confusability between classes of the dataset is determined by reconstructing data for each class using an autoencoder trained using a first class of the classes and determining a reconstruction error for each class other than the first class.

3. The computer-implemented method of claim 1, wherein the confusability between classes of the dataset is determined by using a data similarity method to compute a confusion matrix.

4. The computer-implemented method of claim 1, wherein hamming codes are generated by maximizing the hamming distance between target labels; where the target labels are weighted based on the confusability between classes in the dataset, and wherein there is one hamming code per class in the dataset.

5. The computer-implemented method of claim 1, wherein training is conducted by backpropagation with binary cross entropy loss.

6. The computer-implemented method of claim 1, further comprising:
    forward propagating using the trained AI model;
    binarizing top-k logits of a sigmoid layer to produce a binarized code;
    computing Euclidean distance from the binarized code to a set of target hamming codes; and
    selecting an output label corresponding to a closest hamming code to thereby produce an inference result.

7. The computer-implemented method of claim 1, wherein the dataset is a dataset of images.

8. A non-transitory computer program product comprising a computer readable storage medium having program instructions embodied therewith, the program instructions executable by one or more processors to cause the one or more processors to perform a method comprising: generating a hamming code based target label for each class of a dataset in which hamming distance between the target labels in the dataset is maximized; and training a convolutional neural network with the modified dataset to thereby produce a trained AI model, wherein confusability between classes of the dataset is determined using a confusion matrix, and wherein the hamming distances of classes of the dataset that are determined to be more confusable are set to higher values than the hamming distances of classes of the dataset that are determined to be less confusable.

9. The non-transitory computer program product of claim 8, wherein the confusability between classes of the dataset is determined by reconstructing data for each class using an autoencoder trained using a first class of the classes and determining a reconstruction error for each class other than the first class.

10. The non-transitory computer program product of claim 8, wherein the confusability between classes of the dataset is determined by using a data similarity method to compute a confusion matrix.

11. The non-transitory computer program product of claim 8, wherein hamming codes are generated by maximizing the hamming distance between target labels; where the target labels are weighted based on the confusability between classes in the dataset, and wherein there is one hamming code per class in the dataset.

12. The non-transitory computer program product of claim 8, wherein training is conducted by backpropagation with binary cross entropy loss.

13. The non-transitory computer program product of claim 8, forward propagating using the trained AI model; binarizing top-k logits of a sigmoid layer to produce a binarized code; computing Euclidean distance from the binarized code to a set of target hamming codes; and selecting an output label corresponding to a closest hamming code to thereby produce an inference result.

14. The non-transitory computer program product of claim 8, wherein the dataset is a dataset of images.

15. A system including one or more processors configured to implement a method comprising:
    generating a hamming code based target label for each class of a dataset in which hamming distance between the target labels in the dataset is maximized; and
    training a convolutional neural network with the modified dataset to thereby produce a trained AI model,
    wherein confusability between classes of the dataset is determined using a confusion matrix, and
    wherein hamming distances of classes of the dataset that are determined to be more confusable are set to higher values than the hamming distances of classes of the dataset that are determined to be less confusable.

16. The system of claim 15, wherein the confusability between classes of the dataset is determined by reconstructing data for each class using an autoencoder trained using a first class of the classes and determining a reconstruction error for each class other than the first class.

17. The system of claim 15, wherein the confusability between classes of the dataset is determined by using a data similarity method to compute a confusion matrix.

18. The system of claim 15, wherein hamming codes are generated by maximizing the hamming distance between target labels; where the target labels are weighted based on the confusability between classes in the dataset, and wherein there is one hamming code per class in the dataset.

19. The system of claim 15, wherein training is conducted by backpropagation with binary cross entropy loss.

20. The system of claim 15, wherein the method further comprising:
   forward propagating using the trained AI model;
   binarizing top-k logits of a sigmoid layer to produce a binarized code;
   computing Euclidean distance from the binarized code to a set of target hamming codes; and
   selecting an output label corresponding to a closest hamming code to thereby produce an inference result.

* * * * *